C. STATTMANN.
Combined Collar and Muff.

No. 167,799. Patented Sept. 14, 1875.

Witnesses.
Chas. Wahlers
Ernst Billhuber

Inventor.
Christian Stattmann
p.
Van Santvoord & Hauff
Attys

UNITED STATES PATENT OFFICE.

CHRISTIAN STATTMANN, OF NEW YORK, N. Y.

IMPROVEMENT IN COMBINED COLLARS AND MUFFS.

Specification forming part of Letters Patent No. 167,799, dated September 14, 1875; application filed January 29, 1875.

*To all whom it may concern:*

Be it known that I, CHRISTIAN STATTMANN, of the city, county, and State of New York, have invented a certain new Combined Collar and Muff, of which the following is a specification:

This invention is illustrated in the accompanying drawing, in which—

Figure 1:
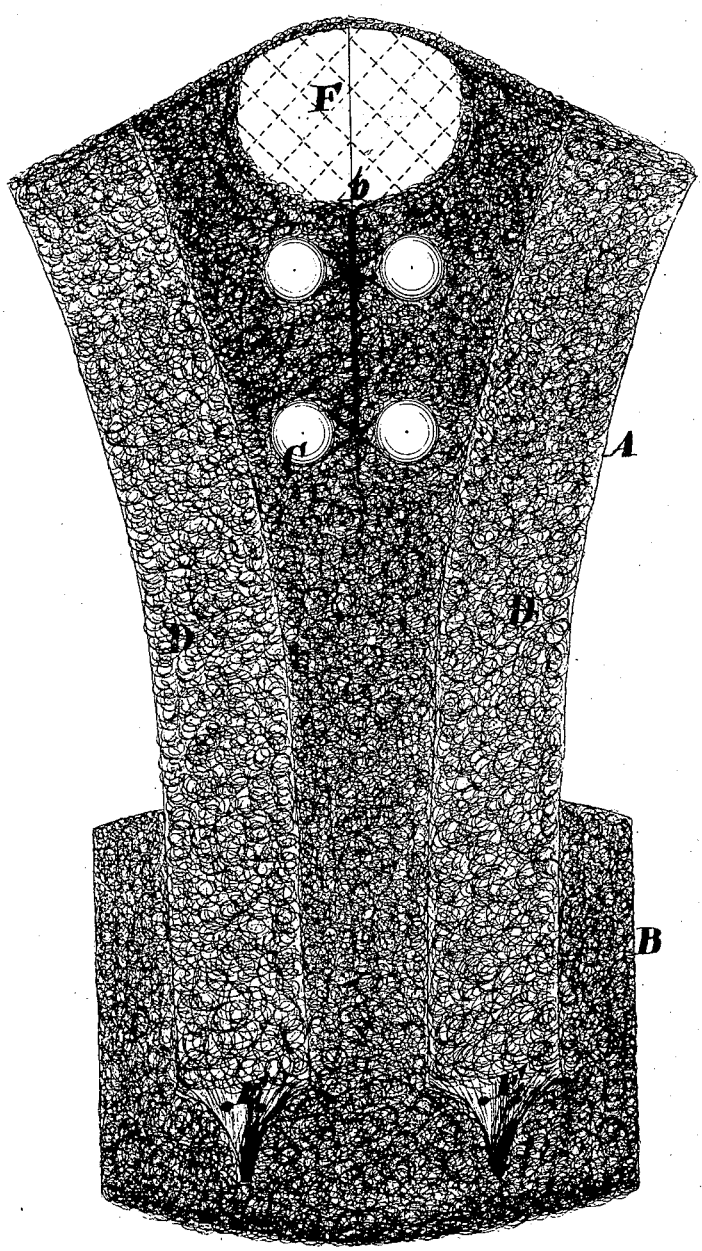
Figure 2:
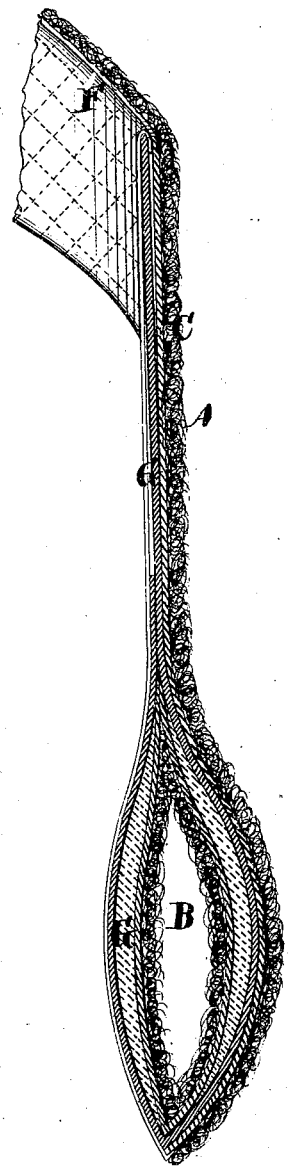

Figure 1 is a front view. Fig. 2 is a longitudinal section.

Similar letters indicate corresponding parts.

This invention consists in a collar and muff, combined or connected together by means of a supporting-strip, in addition to the front and lining, in such a manner that the two articles are more rigidly supported on each other and preserved in shape.

The letter A designates the collar, and B the muff, which may be made of fur or cloth, or of both, as seen fit. The face of the muff and a portion of the face of the collar is made in one piece of material, C, while with the collar is combined additional or outer pieces, D. The outer pieces D are connected to the inner or muff piece C by sewing or in any other suitable manner, and they are made to terminate in animal-heads E or other ornamental appendages, whereby they acquire the appearance of a boa, as seen in Fig. 1.

The inner piece C of the collar is provided with an aperture, F, from which extends a slit, b, whereby the collar may be drawn over the head of the wearer, the collar being, by this means, put on or taken off. The slit b is closed by means of loops secured to buttons, or by any other means suitable for the purpose.

Between the front and lining of my combined collar and muff is inserted a supporting-piece, G, Fig. 2, of ticking or other flexible material possessing the stiffness of ticking, which extends the entire length of the collar, or nearly so, and around the muff, being stitched to the front or to the lining at suitable intervals, whereby the muff and collar are more rigidly connected to each other, and their shape is preserved for a long time.

My combined collar and muff may be made of any chosen form or outline. It presents a very handsome appearance, while the danger heretofore existing of misplacing or losing one or the other of these articles is averted.

I am aware that a muff having a collar-piece to form a combined collar and muff is not new, and such, broadly, I disclaim.

What I claim as new, and desire to secure by Letters Patent, is—

In a combined collar and muff, the flexible supporting-piece G arranged between the front and lining of the collar and muff, and extending the entire length of the collar - piece and entirely around the muff, substantially as described, whereby the shape of the latter and the collar is preserved, as and for the purpose specified.

In testimony that I claim the foregoing I have hereunto set my hand and seal.

CHRISTIAN STATTMANN. [L. S.]

Witnesses:
 E. F. KASTENHUBER,
 FRANCIS FORBES.